(12) United States Patent
Carro (10) Patent No.: US 7,871,271 B2
(45) Date of Patent: *Jan. 18, 2011

(54) CREATION AND USE OF HYPERLINKS FOR ACCESSING INFORMATION PERTAINING TO CONTENT LOCATED IN A BRAILLE DOCUMENT

(75) Inventor: Fernando Incertis Carro, Valencia (ES); Rita Asuncion Jarillo Sanchez, legal representative, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 11/853,088

(22) Filed: Sep. 11, 2007

(65) Prior Publication Data

US 2008/0003548 A1 Jan. 3, 2008

Related U.S. Application Data (63) Continuation of application No. 10/468,638, filed as application No. PCT/EP02/02618 on Mar. 15, 2002, now Pat. No. 7,316,566.

(30) Foreign Application Priority Data

Mar. 15, 2001 (EP) .................................. 01480023

(51) Int. Cl.
G09B 21/00 (2006.01)
(52) U.S. Cl. .................. 434/113; 434/115; 715/500
(58) Field of Classification Search .................. 400/109; 434/112–117
See application file for complete search history.

(56) References Cited

U.S. PATENT DOCUMENTS 4,686,332 A 8/1987 Greanias et al.

(Continued)

FOREIGN PATENT DOCUMENTS

EP 0 959 445 A2 11/1999

(Continued)

OTHER PUBLICATIONS

Petrie, Helen et al.; Inexpensive Tactile Interaction for Blind Computer Users: Two Application Domains. IEEE [online], 1997 [retrieved on Nov. 18, 2005]. Retrieved from the Internet: < URL: http://ieeexplore.ieee.org/ie14/5577/14913/0067670.1.pdf?amumber-676701 >. 3 pages.

(Continued)

*Primary Examiner*—Kesha Y. Frisby
(74) *Attorney, Agent, or Firm*—Schmeiser, Olsen & Watts; William H. Steinberg

(57) ABSTRACT

A user system for detection and access of hyperlinks within a Braille document. A hyperlink table is generated and includes for each touched item on a page of the Braille document: identification of the touched item, a hyperlink associated with the touched item, and spatial coordinates of the touched item on the page of the Braille document. After the hyperlink table is generated, a proximity sensing foil placed under a Braille page senses the position of a user's fingertips and provides coordinates of the sensed position on the Braille page. A distance between the sensed position and spatial coordinates stored in the hyperlink table is determined to be less than a predetermined distance, resulting in alerting the user via a signal, identifying a hyperlink in the hyperlink table associated with the sensed position, retrieving information from a destination address associated with the identified hyperlink, and displaying the retrieved information.

10 Claims, 11 Drawing Sheets

U.S. PATENT DOCUMENTS

| | | | |
|---|---|---|---|
| 4,893,115 A | | 1/1990 | Blanchard |
| 4,985,692 A | * | 1/1991 | Breider et al. ............ 340/407.2 |
| 5,365,461 A | | 11/1994 | Stein et al. |
| 5,708,825 A | * | 1/1998 | Sotomayor ................... 715/205 |
| 5,714,978 A | | 2/1998 | Yamanaka et al. |
| 5,725,379 A | | 3/1998 | Perry |
| 5,831,597 A | | 11/1998 | West et al. |
| 5,902,112 A | | 5/1999 | Mangold |
| 5,951,298 A | | 9/1999 | Werzberger |
| 5,983,184 A | | 11/1999 | Noguchi |
| 5,991,781 A | | 11/1999 | Nielsen |
| 6,018,710 A | | 1/2000 | Wynblatt et al. |
| 6,049,328 A | | 4/2000 | Vanderheiden |
| 6,059,575 A | | 5/2000 | Murphy |
| 6,083,270 A | | 7/2000 | Scott |
| 6,115,482 A | | 9/2000 | Sears et al. |
| 6,125,385 A | | 9/2000 | Wies et al. |
| 6,128,671 A | * | 10/2000 | Weijand ......................... 710/5 |
| 6,163,280 A | * | 12/2000 | Breider ......................... 341/21 |
| 6,459,364 B2 | | 10/2002 | Gupta |
| 2002/0069240 A1 | * | 6/2002 | Berk ........................... 709/203 |

FOREIGN PATENT DOCUMENTS

GB    2 351 639 A    1/2001

OTHER PUBLICATIONS www.accessboard.gov; Aug. 2000. [online]. 2 pages. [retrieved on Jun. 22, 2010]. Retrieved from the Internet: < URL: http://web.archive.org/web/20030721235846/http://www.access-board.gov/ >.

IBM Accessibility Center Web page: http://www-3.ibm.com/able/. [online]. 1 page. [retrieved on Jun. 15, 2010]. Retrieved from the Internet: < URL: http://web.archive.org/web/20001109013900/http://www-3.ibm.com/able/ >.

www.microtouch.com/; ThruGlassTM (Projected Capacitive Touchscreens) is a trademark of Micro Touch company. The ThruGlass technology is fully destribed in the Web site of Micro Touch Company. [online]. 2 pages. [retrieved on Jun. 22, 2010]. Retrieved from the Internet: <URL: http://web.archive.org/web/20030812072848/www.3m.com/3mtouchsystems/>.

* cited by examiner

David Nash Ford

⠀

*Early British Kingdoms*

⠀ http://freespace.virgin.net/

Document: 0873

⠀

© Celtic World Ltd., Binfield, Berkshire, UK (1999)

| Doc: 0873 | Title: "Early British Kingdoms" | Author: David Nash Ford of Binfield, Berkshire, UK |
|---|---|---|
| | Date: 28/01/2000 | ISBN: 84-344-0856-2 |
| Pg: 3 | | |
| X=45  Y=130 | Link: Buellt & Gwerthrynion | http://freespace.virgin.net/david.ford2/buellt.html |
| X=205  Y=170 | Link: Caer-Badden (Bath) | http://freespace.virgin.net/david.ford2/south.html#Gloui |
| X=75  Y=190 | Link: Caer-Celemion (Silchester) | http://freespace.virgin.net/david.ford2/vortigem.html |
| X=110  Y=255 | Link: Ceredigion | http://freespace.virgin.net/david.ford2/ceredigion.html |
| ....... | | |
| X=30  Y=260 | Link: Editor Phone Number | Phone://54-26-555-1234 |
| ....... | | |
| Pg: 16 | | |
| X=30  Y=95 | Link: Mabinogion | http://www.cyberphile.co.uk/-taff/t affnet/mabinogion/mabinogion.htm |
| X=255  Y=150 | Link: Avalon | http://freespace.virgin.net/david.ford2/avalon.html |
| X=255  Y=160 | Link: Afallach | http://freespace.virgin.net/dagid.ford2ods.html#Afallach |
| X=190  Y=230 | Link: Beli Mawr | http://freespace.virgin.net/david.ford2/gods.html#Beli |
| ....... | | |
| ....... | | |
| Pg: 39 | | |
| X=25  Y=30 | Link: St. Joseph of Arimathea | http://freespace.virgin.net/david.ford2/joseph.html |
| X=80  Y=75 | Link: The Kinds of Dumnonia | http://freespace.virgin.net/david.ford2/dumnonia.html |
| X=140  Y=135 | Link: Eudaf Hen & Conan Meri | http://freespace.virgin.net/david.ford2/eudanc.html |
| ....... | | |

CREATION AND USE OF HYPERLINKS FOR ACCESSING INFORMATION PERTAINING TO CONTENT LOCATED IN A BRAILLE DOCUMENT

This application is a Continuation of Ser. No. 10/468,638, filed Aug. 20, 2003, now U.S. Pat. No. 7,316,566 issued Jan. 8, 2008. U.S. Pat. No. 7,316,566 is a 371 of PCT/EP02/02618 filed Mar. 15, 2002.

FIELD OF THE INVENTION

The present invention relates generally to the accessibility, by blind and vision impaired people, to interactive hypermedia systems such as the Web directly from Braille documents.

BACKGROUND

Accessibility

Many groups in academia, government, and private industry are working on ways to guarantee universal access to the on-line world for all segments of society. This social movement, combined with a strong push to provide better accessibility in the workplace, is driving an increasingly urgent call for novel technologies.

As information technology (IT) penetrates all commercial and public transactions and communications, worldwide advocates for people with disabilities have demanded accessibility for everyone. In response, governments have begun to require IT to be accessible for people with disabilities through new regulations and standards. In the United States, for example, federal, state and local governments have initiated legislation requiring computer technology to be accessible to people with disabilities (refer to web site www.access-board.gov). Many other countries have established regulations that mandate accessibility at some level, or they are in the process of developing them. In addition, international standards organizations have been working to develop accessibility standards.

Accessibility Aids for Blind People

For someone who is completely unable to use a normal screen or read printed text, there are two alternatives: Braille and Speech. The assistance of blind and visually impaired people encompasses today a wide range of technical solutions from interactive speech software and cognitive tools, to screen reader software, screen enlargement programs, keyboard access utilities, and so forth.

Screen Readers convert text to speech, allowing blind or vision-impaired users to hear what is displayed on their computer screen. For example, "Jaws for Windows" is a computer screen-reader application from Henter-Joyce. It operates with Windows NT 4.0, Windows 98 and Windows 95 and includes an enhanced software speech synthesizer for speaking in several languages. Note: Windows is a trademark of Microsoft Corporation, a company with corporate headquarters in Redmond, Wash., USA.

Web Page Readers read aloud Web-based text just as it appears on enabled Web pages. For example, "Home Page Reader" of IBM, understands HTML (Hypertext Markup Language), the programming language used to design Web pages. It can accurately read text in tables, or included in graphic descriptions, thus allowing blind users to navigate easily on the Web. Note: IBM is a trademark of International Business Machines Corporation, a company with corporate headquarters in Armonk, N.Y., USA.

Mail Readers use a screen reader for converting the text of an e-mail to speech. For example, the built-in features of "Lotus Notes Release 5" by IBM enable blind users to check the status of their e-mail (unread, read, deleted), to use calendar functions, and to file and organize documents.

Scanning Reading Systems first scan the information printed on a physical support. Then, using a speech synthesizer, this information can be read to blind people. For example, "Open Book: Ruby Edition 4.0" by IBM is a program that transforms a computer, a sound card, and a scanner into a complete reading machine for reading books, magazines, memos, bills, and many other printed documents.

Braille Editing Systems (BES) enable users to input Braille characters from the keyboard. For instance, IBM provides a BES that can be downloaded free of charge from the IBM Web.

Screen Magnifiers enable users with low-vision to magnify text and images on the computer screen. For example, "MAGic Screen Magnification," from Henter-Joyce, is a screen magnification product for Windows.

Relevance of Braille

Braille is a code which enables blind people to read and write. Braille characters are made of a rectangular "cell" comprising six dots in up to 63 combinations. The alphabet, numbers, music notation, and any other symbol that appears in print can be replicated in Braille by arranging the combinations of the six dots. The dots of Braille are also used for mathematics, scientific equations, computer notations, and foreign languages. Braille is embossed by hand or with a machine onto thick paper, and read by touching the Braille characters, usually using the first finger on one or both hands moving across on top of the dots. Since Braille characters take up three times as much space as print, a set of standard contractions, known as Grade 2 Braille, has been defined to save space. With just 6 dots it is possible to define numbers, punctuation, math, and music. Grade 3 Braille provides an even more contracted form.

All people need to read, write, and count in order to enjoy intellectual freedom, personal security, and equal opportunities in our society. Braille is the universal alphabet for those whose vision is sufficiently impaired that they cannot read printed documents. Braille is the only reliable method of literacy for blind persons because it enables them to read and write. Thus, blind persons of all ages and in all walks of life need to use Braille in the same ways that sighted persons need to use print.

Listening is not literacy. Although the use of tape recorders and computers with synthetic speech have recently reduced the use of Braille, listening to a document is not the same thing as reading it. Braille is the best way for children who are blind or visually impaired to develop skills in spelling, grammar, and punctuation. Audio tapes and computers that read a text through a voice synthesizer program provide access to all sorts of written materials, but they fail to give new readers the tools that they need to read and write for themselves and to perform complex tasks independently. For example, although some complex charts and graphs are almost impossible to describe orally, they can clearly be communicated in Braille.

Web Access from Braille Documents

Recently, due mainly to the widespread use of personal computers and the universal access of millions of users to the World Wide Web, "multimedia publishing" has veritably exploded. Due to the widespread penetration of CD-ROM drives, an enormous number of multimedia titles combining text, images, and sounds, are now accessible to owners of personal computers. In this evolution, a large amount of hypermedia information is accessible today via the Internet on the World Wide Web, by sighted as well as by blind people. Today, many people agree that Braille documents are the most universal and convenient source of information for the blind, and that, in the future, the Web could be an important source of information.

Consequently, an object of the invention is to promote the use of Braille by enhancing the information provided to blind people when reading Braille documents.

Another object of the present invention is to enable blind people to select and access electronic multimedia services provided by one or a plurality of servers connected on a communication network, preferably the World Wide Web.

Another object of the present invention is to enable blind people to select and access an electronic multimedia service directly from Braille documents.

Yet another object of the present invention is to enable blind people to sense, over a Braille document, hyperlinked physical regions that can be selected to access electronic multimedia services.

A further object of the present invention is to select and access an electronic multimedia service simply by detecting the proximity of the user's fingertips to hyperlinked physical regions over a Braille document while preserving the integrity of the document.

It is a particular object of the invention to improve the access to the World Wide Web for blind people.

SUMMARY

The invention relates generally to the accessibility of blind and vision impaired people to interactive hypermedia systems such as the Web directly from Braille documents.

The invention is directed to a system and method for use, in a user system, for accessing hyperlinks to information or services from a Braille document comprising one or more pages. The method comprises the steps of:

identifying and selecting one or more pages;

for each selected page of the Braille document:
  detecting, using a proximity sensing foil placed and aligned under the page, items touched by the user on the surface of the page;

for each touched item on the page:
  determining the physical position of the touched item on the page by means of the proximity sensing foil;
  storing, in a hyperlink table, an identification of the touched item based on the physical position, on the proximity sensing foil, of the touched item;
  creating, in the hyperlink table, a hyperlink from the touched item to information and/or service (both of which are referred to generically herein below as "information").

The invention is also directed to a method and system for use in a user system for accessing information and services from one or more hyperlinked items located in a Braille document. The method includes the steps of:
  identifying a Braille document;
  identifying a page of the Braille document;
  determining whether or not the identified page comprises one or more hyperlinked items referring to a hyperlink table associated with the Braille document, the hyperlink table comprising, for each identified page, a list of hyperlinked items;
  determining, using a proximity sensing foil placed and aligned under the selected page, the position of the user's fingertips on the surface of the page;
  alerting the user when his fingertips are positioned over, or in the proximity of, a hyperlinked item;
  detecting the selection of a hyperlinked item by the user;
  identifying the selected hyperlinked item in the hyperlink table from its position on the selected page, the hyperlink table comprising an indication of the position of each hyperlinked item on the selected page;
  identifying the information or/and the service associated with the selected hyperlinked item referring to the hyperlink table, the hyperlink table comprising for each hyperlinked item of the selected page an identification of information and/or a service; and
  accessing the information and/or service.

BRIEF DESCRIPTION OF THE DRAWINGS

The invention will best be understood by reference to the following detailed description of an illustrative embodiment when read in conjunction with the accompanying drawings, wherein.

DETAILED DESCRIPTION

The present invention is directed to a system and method to make interactive multimedia information and services linked with items (e.g., words or relief regions) embossed or engraved on physical Braille documents accessible to blind or visually impaired users.

The invention includes a system and method to enable blind people to detect hyperlinks and to access, from these hyperlinks, multimedia information and/or services located on one or more servers connected to a communication network. An acoustic signal may be used to call the user's attention to hyperlinked items or regions on the physical surface of a Braille document. This signal is activated by the proximity of the user's fingertip.

The system includes: a proximity sensing foil placed under the page of the Braille document for determining the position of the user's fingertips and for computing its coordinates, and a user system, preferably a personal computer or a workstation, for comparing the position of the user's fingertips over the Braille document with the location of predefined hyperlinked items on the Braille document. An acoustic signals alerts the user when one of his fingertips is detected by the system in the vicinity of a hyperlink. The user can then select and activate this hyperlink and can access the information and/or the service associated with the selected hyperlink.

While a user is reading a page of a Braille document, a proximity sensing foil placed under the page detects the position of his fingertips and computes the coordinates of the sensed position. These coordinates are sent to the user workstation. The user workstation then computes the distance between the sensed position and the positions of the hyperlinks defined on this page. The coordinates of hyperlinks are stored in a hyperlink table during an initial phase. If the computed distance between the sensed position and a particular hyperlink on the hyperlink table is smaller than a predetermined minimum value, it is concluded that user's fingertips are positioned over the corresponding hyperlink. The user workstation then alerts the user by an acoustic signal or any other perceptible signal that a hyperlink is associated with the item. The user can then choose to activate this hyperlink by any means (e.g., by pressing a special key on the user workstation). When the user activates the detected hyperlink, the user workstation identifies, in the same hyperlink table, a server, and, within this server, the information and/or the service associated with the detected hyperlink. Finally, a request is sent to the identified server for accessing the desired information and/or service.

In an illustrative embodiment, the user workstation is connected to the Internet, and comprises a Web Browser application. Servers are Web servers, and the information or/and the service may be Web pages linked to the items embossed or engraved on the Braille document.

Figure 1:
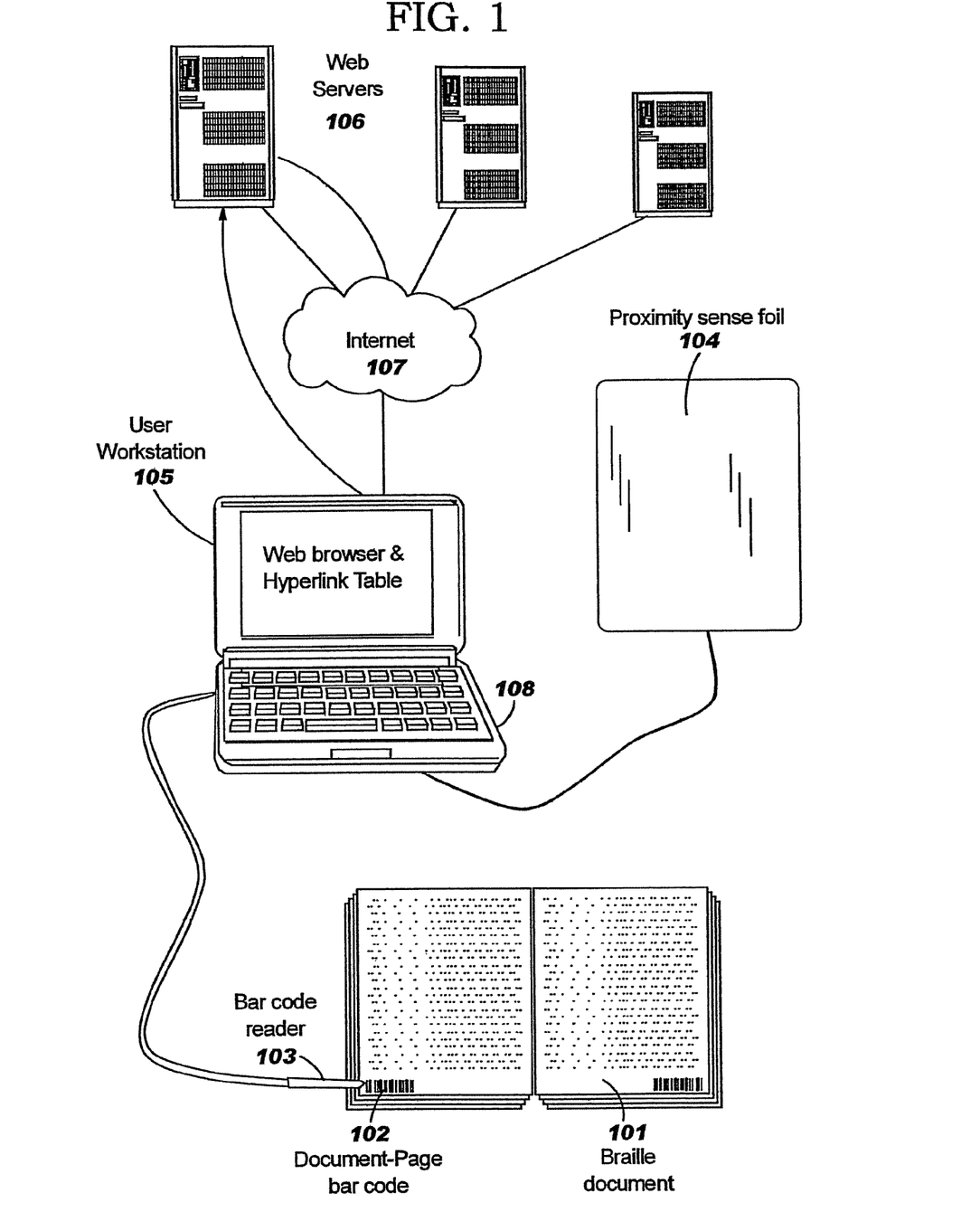
FIG. 1 shows the main components of a preferred embodiment of the present invention, and more particularly a system for identifying a page of a Braille document using a bar code reader.

FIG. 1 illustrates the system according to a preferred embodiment of the present invention. A Braille document (101) (e.g., a Braille book) is shown with bar codes (102) printed on its pages. The Braille document (101) can be any kind of document, for example a newspaper, a novel, a textbook, a technical book, a commercial catalog, or any other type of Braille code engraved or embossed surface. The composition of the document can be paper, plastic, wood or any other nonconductive material. Any Braille character or combination of characters (words) on the document can be hyperlinked to different types multimedia information or services (sounds, music, speech synthesizers, Web page readers, tape players/recorders, and so forth).

A user workstation (105) is provided for accessing and displaying multimedia information and services. The bar codes are read by a bar code reader (103) connected to a user workstation, and are used by the user workstation to identify the document and each page of the document. In an illustrative embodiment, the workstation is connected to a communication network, preferably the Internet. Some of the Braille items on the document are linked to multimedia information and/or services located on the user workstation or on remote servers (106).

A proximity sensing foil (104) is placed underneath a page of the Braille document. The proximity sensing foil (104) may be made of transparent capacitive films of the type commonly used to manufacture touch screens. The generated signal is generally proportional to the coordinates of the point pressed. One example of such a touch foil is the MicroTouch ThruGlass™ projected capacitive technology, with a sensing range of up to 1" (25.4 mm) though paper, glass, or any other non-conductive material. ThruGlass™ (Projected Capacitive Touchscreens) is a trademark of MICRO TOUCH company. The ThruGlass technology is fully described in the Web site of MICRO TOUCH Company at http://www.microtouch.com/.

The user workstation (105) is used to access and display information and/or services locally stored or located on remote servers (106) connected to the network (107). The user workstation may be, for example, an Internet appliance or a multimedia Personal Computer (PC). The proximity sensing foil (104) may communicate with the user workstation, for example using a cable, a wire pair, an infrared link, or a wireless radio link.

To retrieve and display multimedia information or to access a multimedia service associated with a hyperlinked item on a Braille document (101), the user uses a specific key (108) on the keyboard of his workstation. The position of the hyperlinked item detected by the proximity sensing foil identifies a server and the information associated with the selected hyperlinked item within this server. The user workstation (105) then accesses the identified server (106) and retrieves and displays the information or/and service.

Figure 6:
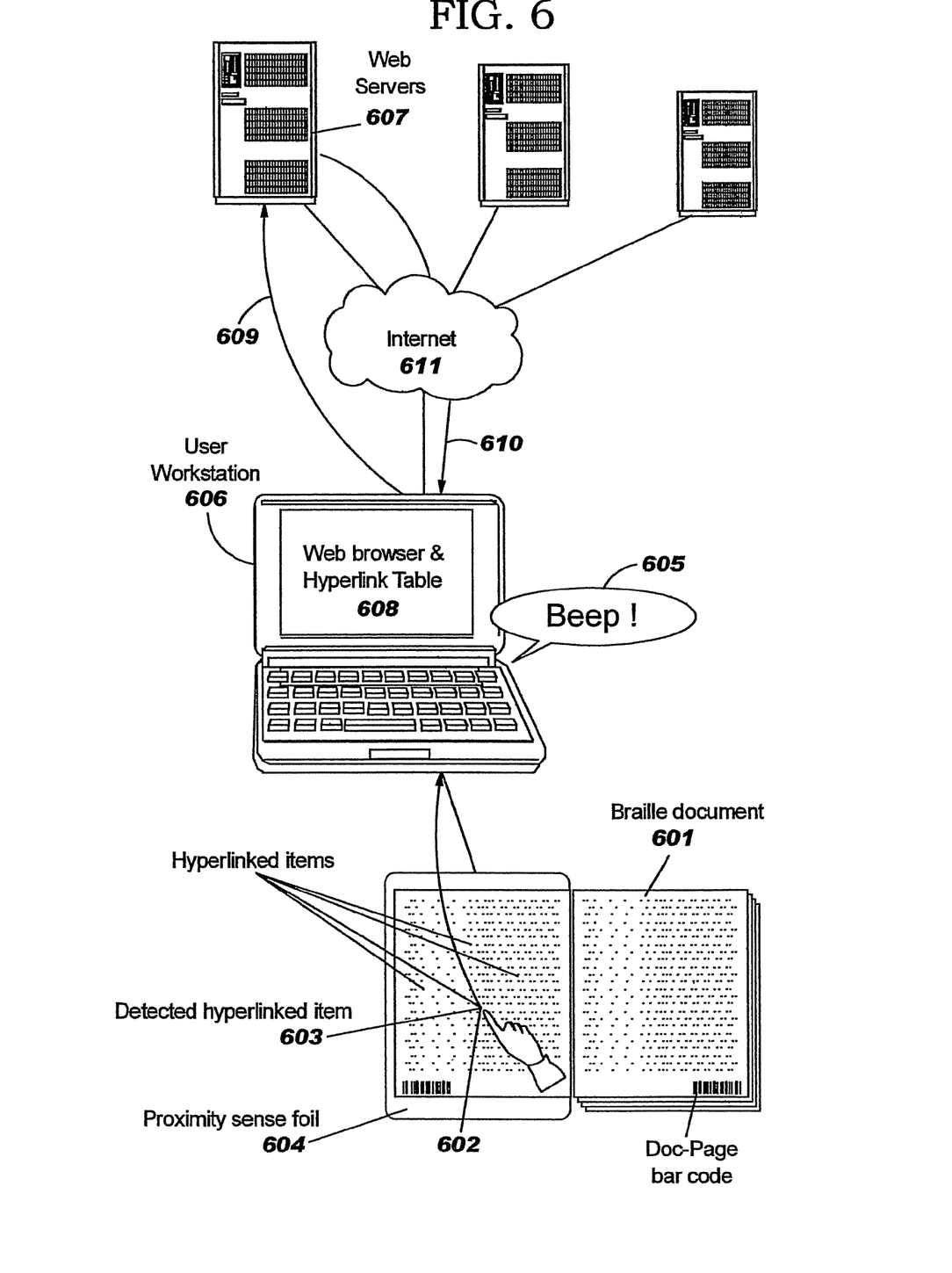
FIG. 6 shows how the user is alerted by a sound, a beep, or any other perceptible signal that the item he reads is a hyperlinked item.

In the illustrative embodiment of the invention shown in FIG. 6, the user workstation (606) is connected to the Internet (611). The user workstation includes a Web Browser (608) (also called "Web Client") to access the World-Wide-Web (WWW). When the user touches (602) a hyperlinked item (603) on the Braille document (601) placed over the proximity sensing foil (604), the user workstation (606) generates an acoustic signal (605). This signal alerts the user that the item contains a hyperlink. The position of the hyperlinked item (603) detected by the proximity sensing foil (604) identifies a Web server (607) and, within this Web server, Web pages or Web multimedia services. Once the hyperlinked item is selected, the Web Browser program (608) sends an HTTP request (609) to the identified Web Server (607). The response (610) to the request (HTTP response) is sent back by the Web Server (607) in the reverse direction to the Web Browser (608). The HTTP response (610) comprises the requested Web pages or Web multimedia services associated with the selected hyperlinked item.

Figure 9:
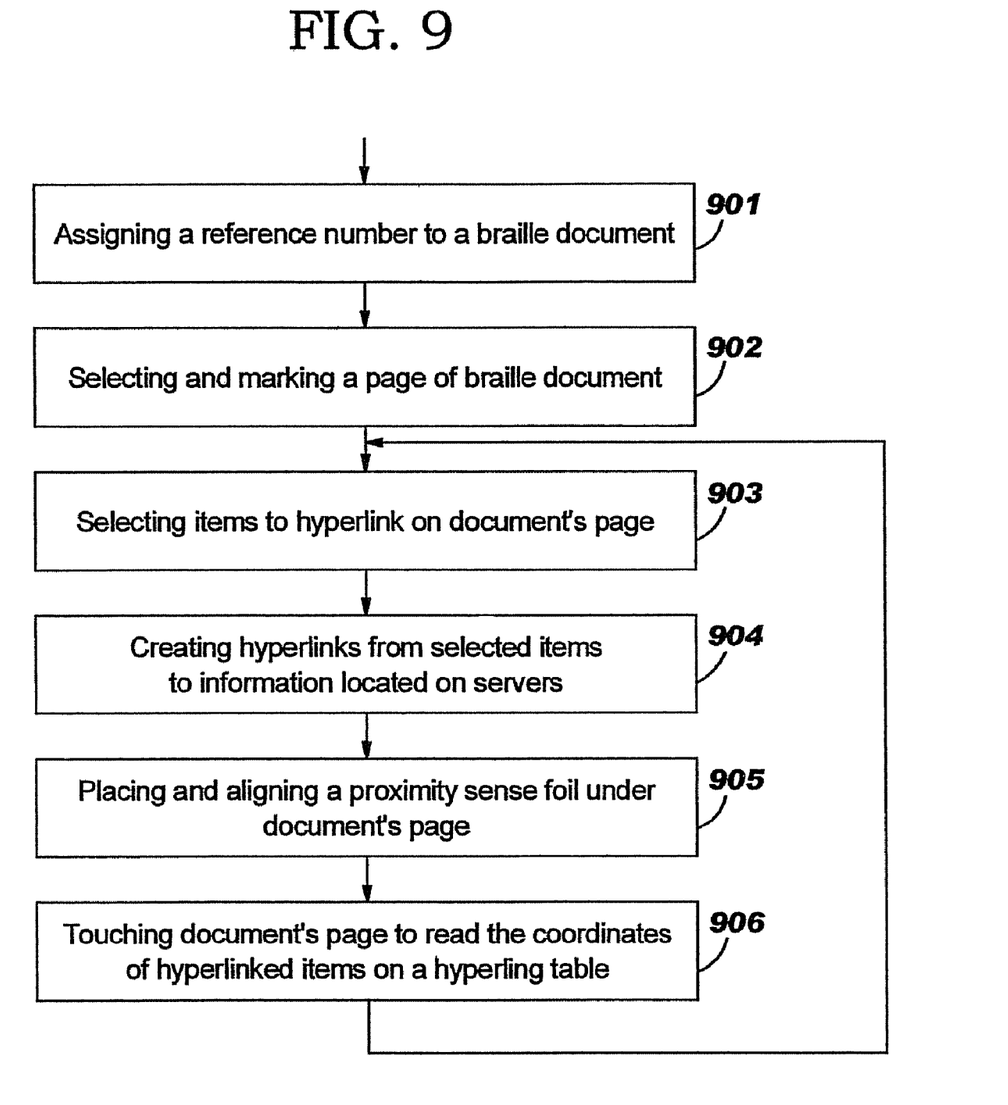
FIG. 9 shows the method for creating hyperlinks on a Braille document according to the present invention.

As shown in FIG. 9, the method of creating hyperlinks for accessing multimedia information or services from items engraved or embossed on a Braille document (like the document shown in FIG. 2 entitled "Early British Kingdoms"), comprises the steps of:

(901) assigning a reference number (201) (identifier) to the Braille document;

(902) selecting one or more pages of the Braille document; assigning an identifying means and marking each selected page of the Braille document;

for each selected page of the Braille document (or portion of the document):

(903) selecting one or more items (engraved or embossed items), preferably Braille characters or Braille words (combination of Braille characters) on the page;

(904) creating hyperlinks from the selected items to information and/or services accessible from the user workstation;

(905) placing and aligning a proximity sensing foil under the page;

touching (906), on the page, the selected hyperlinked item;

determining the position, on the proximity sensing foil, of the touched items; and storing, in a hyperlink table, an identification of each selected hyperlink item based on the position on this proximity sensing foil of each touched item.

Figure 2:
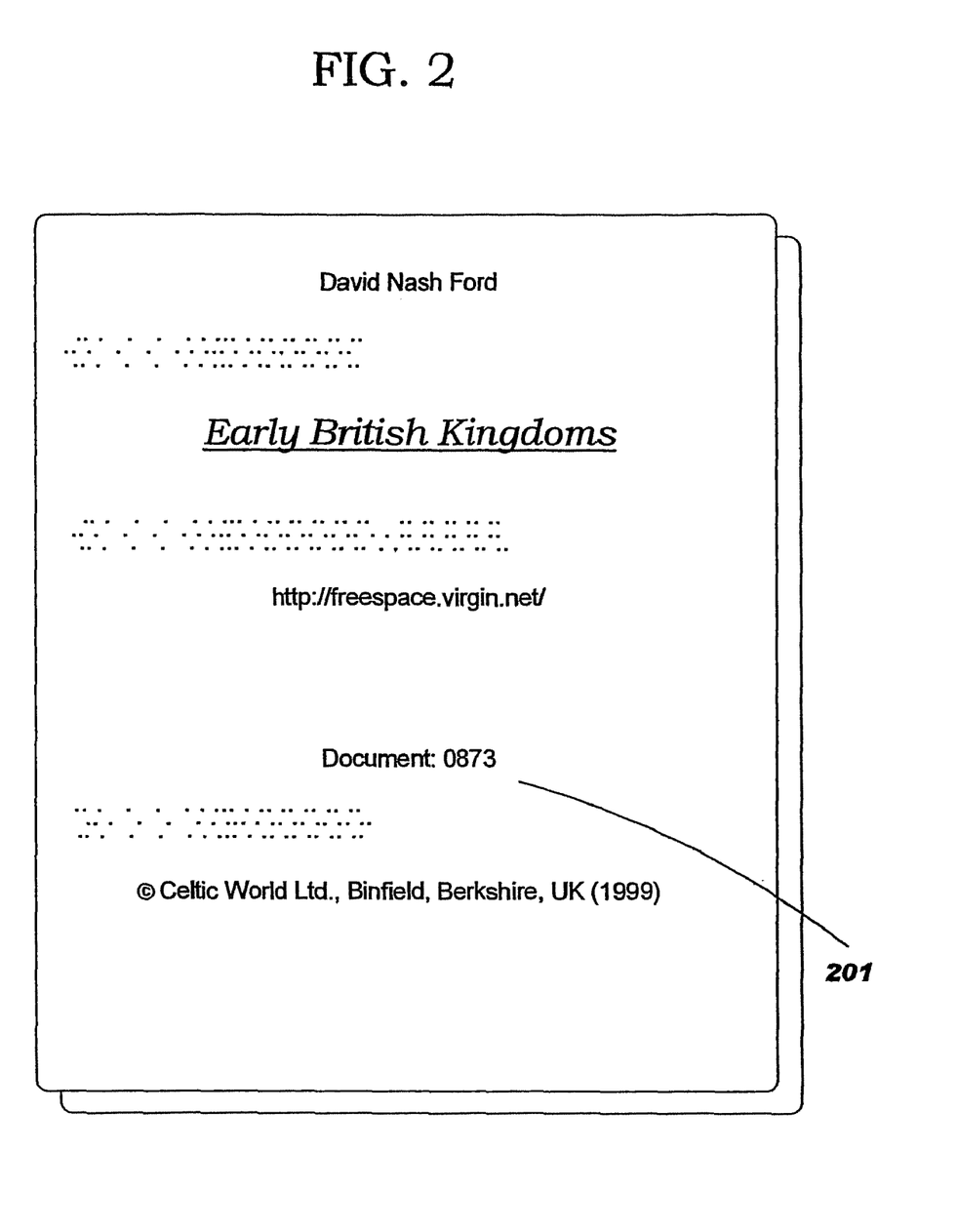
FIG. 2 shows a Braille document.

As shown in FIG. 2, for the editor or publisher, the step of assigning (901) a reference number to a Braille document comprises the further steps of:

- assigning an identifier such as a reference number (201) to this document (e.g., 873) for identifying the document;
- engraving in Braille and printing the identifier on the document;
- creating a hyperlink table accessible from the user workstation; and
- associating the hyperlink table with the document, the hyperlink table comprising the reference number of the document and other relevant information related to the document such as title, author, ISBN (International Standard Book Number), date, and so forth. The hyperlink table may be stored within the user workstation or may be stored in an external memory accessible from the user workstation.

| Doc: 0873 | Title: "Early British Kingdoms" | Author: David Nash Ford of Binfield, Berkshire, UK |
|---|---|---|
| | Date: 28/01/2000 | ISBN: 84-344-0856-2 |
| Pg: 16 | | |
| X = |Y = | Link: Mabinogion | http://www.cyberphile.co.uk/~taff/taffnet/mabinogion/mabinogion.htm |
| X = |Y = | Link: Avalon | http://freespace.virgin.net/david.ford2/avalon.html |
| X = |Y = | Link: Afallach | http://freespace.virgin.net/david.ford2/gods.html#Afallach |
| X = |Y = | Link: Beli Mawr | http://freespace.virgin.net/david.ford2/gods.html#Beli |

In a preferred embodiment, the header of the newly created hyperlink table associated with the document shown in FIG. 2 is built as follows:

| Doc: 0873 | Title: "Early British Kingdoms" | Author: David Nash Ford of Binfield, Berkshire, UK |
|---|---|---|
| | Date: 28/01/2000 | ISBN: 84-344-0856-2 |
| Pg: | | |
| X = |Y = | Link: | |

Figure 3:
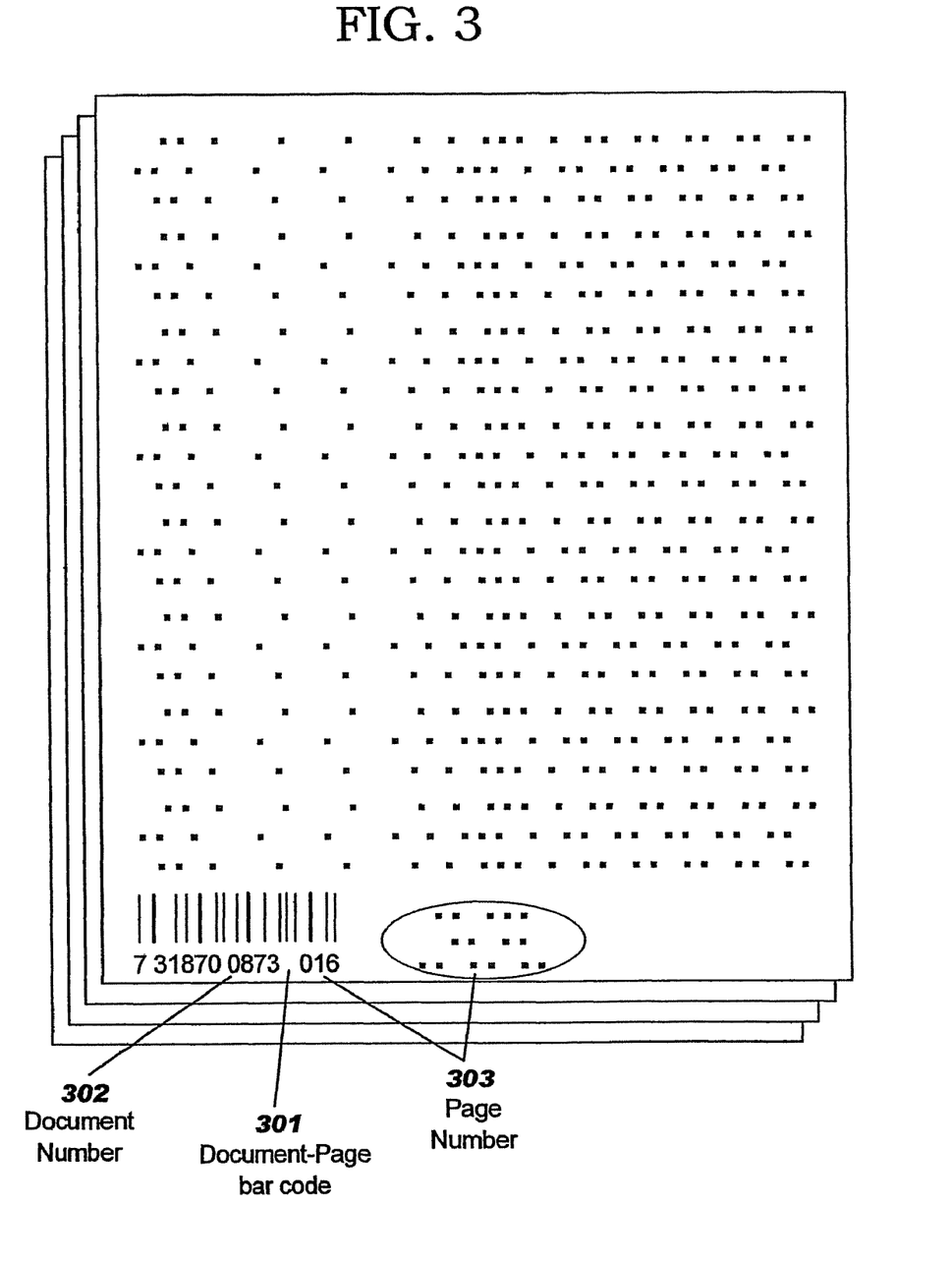
FIG. 3 shows a particular page of a Braille document according to the present invention.

As shown in FIG. 3, for the editor or publisher, the step of selecting and marking (902) pages to create hyperlinks comprises the further steps of generating a bar code (301) for identifying the document number (302) of the document and the page number (303), and attaching (or printing, sticking) this bar code to the page preferably in a fixed and predetermined place (e.g. on the bottom left corner or on the bottom right corner of the page).

A bar code reader may be used to enter the document number and the actual page number into the user workstation. Alternatively, or optionally, the same information may be engraved on Braille characters on the same page of the document.

For the editor or publisher, the step of selecting (903) items on a page of a Braille document and creating (904) hyperlinks comprises the further steps of:

- identifying, locating, and optionally marking the items on the page (e.g., by underlining them);
- storing the page number in the hyperlink table associated with the Braille document (e.g., 16);
- associating each item with a destination address within the communication network, this destination address identifying a server connected to a communication network and the information and/or services the user wants to access within this server; and
- storing the destination address associated with this item (e.g., a URL—Uniform Resource Locator—address for example) in the hyperlink table.

Figure 5:
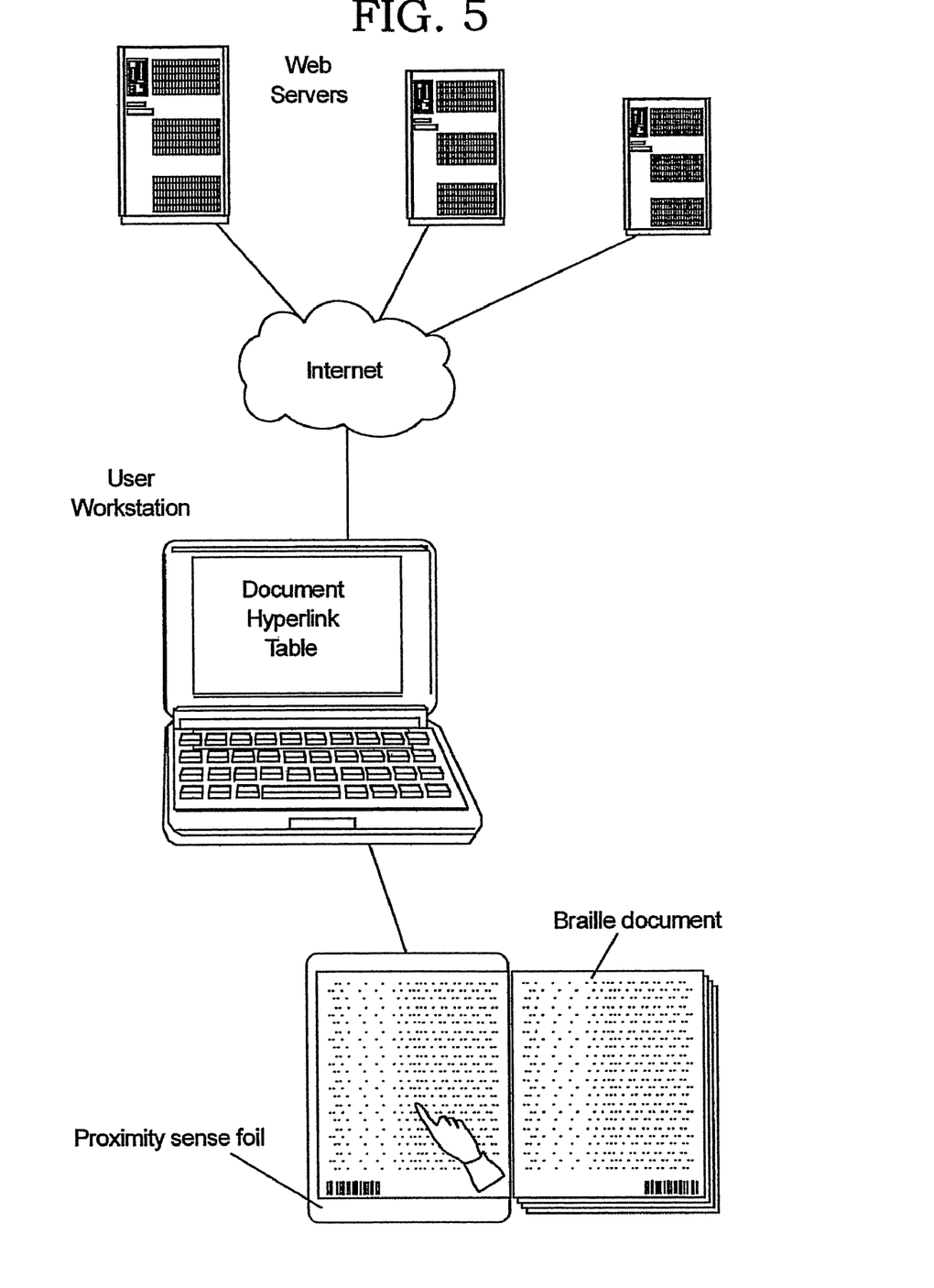
FIG. 5 shows a proximity sensing foil placed and aligned under a page of a Braille document according to the present invention.

In the preferred embodiment, the hyperlink table associated with the page shown in FIG. 3 is built as follows:

As shown in FIG. 5, after the hyperlinked items have been defined in the hyperlink table associated with the Braille document, the proximity sensing foil is placed over (or under) the page and aligned with the borders of this page (e.g., by adjusting the upper left corner of the proximity sensing foil with the upper left corner of the page).

(906) To determining the position of hyperlinked items on the page by means of the proximity sensing foil placed underneath, as shown also in FIG. 5, for each Braille item previously marked on the page ("Mabinogion", "Avalon", "Afallach", "Beli Mawr"), the user presses (e.g., by the finger tip) the corresponding mark of the item on the page. Once the coordinates of each marked item on the page have been measured, the hyperlink table is updated as follows:

| Doc: 0873 | Title: "Early British Kingdoms" | Author: David Nash Ford of Binfield, Berkshire, UK |
|---|---|---|
| | Date: 28/01/2000 | ISBN: 84-344-0856-2 |
| Pg: 16 | | |
| X = 30|Y = 95 | Link: Mabinogion | http://www.cyberphile.co.uk/~taff/tafffnet/mabinogin/mabinogion.htm |
| X = 255|Y = 150 | Link: Avalon | http://freespace.virgin.net/david.ford2/avalon.html |
| X = 225|Y = 160 | Link: Afallach | http://freespace.virgin.net/david.ford2/gods.html#Afallach |
| X = 190|Y = 230 | Link: Beli Mawr | http://freespace.virgin.net/david.ford2/gods.html#Beli |

For example, on page 16 of document 873 entitled "Early British Kingdoms," writen by David Nash Ford of Binfield, the coordinates of the Braille engraved word "Mabinogion" are X=30/Y=95. This Braille marked word "Mabinogion" points to the URL address http://www.cyberphile.co.uk/~taff/taffnet/mabinogion/mabinogion.htm.

Figure 4:
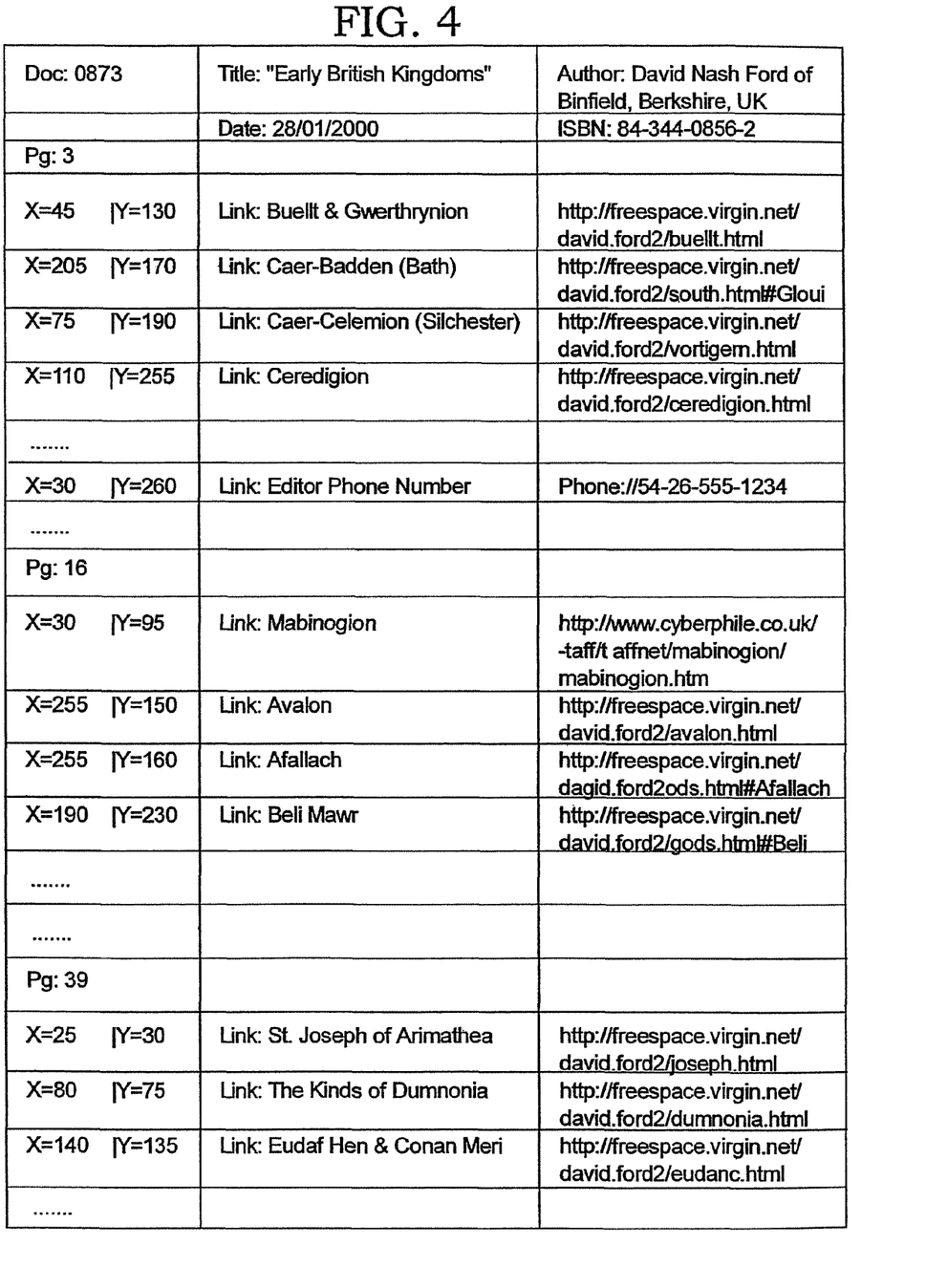
FIG. 4 shows the content of a hyperlink table associated with a Braille document according to the present invention.

Using the herein described method for the different pages of the same document, the hyperlink table, also shown on FIG. 4, appears as follows:

| | | |
|---|---|---|
| Doc: 0873 | Title: "Early British Kingdoms" Date: 28/01/2000 | Author: David Nash Ford of Binfield, Berkshire, UK ISBN: 84-344-0856-2 |
| Pg: 3 | | |
| X = 45\|Y = 130 | Link: Buellt & Gwerthrynion | http://freespace.virgin.net/david.ford2/buellt.html |
| X = 205\|Y = 170 | Link: Caer-Baddan (Bath) | http://freespace.virgin.net/david.ford2/south.html#Gloui |
| X = 75\|Y = 190 | Link: Caer-Celemion (Silchester) | http://freespace.virgin.net/david.ford2/vortigern.html |
| X = 110\|Y = 255 | Link: Ceredigion | http://freespace.virgin.net/david.ford2/ceredigion.html |
| ... | | |
| Pg: 16 | | |
| X = 30\|Y = 95 | Link: Mabinogion | http://www.cyberphile.co.uk/~taff/taffnet/mabinogion/mabinogion.htm |
| X = 255\|Y = 150 | Link: Avalon | http://freespace.virgin.net/david.ford2/avalon.html |
| X = 225\|Y = 160 | Link: Afallach | http://freespace.virgin.net/david.ford2/gods.html#Afallach |
| X = 190\|Y = 230 | Link: Beli Mawr | http://freespace.virgin.net/david.ford2/gods.html#Beli |
| ... | | |
| Pg: 39 | | |
| X = 25\|Y = 30 | Link: St. Joseph of Arimathea | http://freespace.virgin.net/david.ford2/joseph.html |
| X = 80\|Y = 75 | Link: The Kings of Dumnonia | http://freespace.virgin.net/david.ford2/dumnonia.html |
| X = 140\|Y = 135 | Link: Eudaf Hen & Conan Meri. | http://freespace.virgin.net/david.ford2/eudanc.html |
| ... | | |

Figure 10:
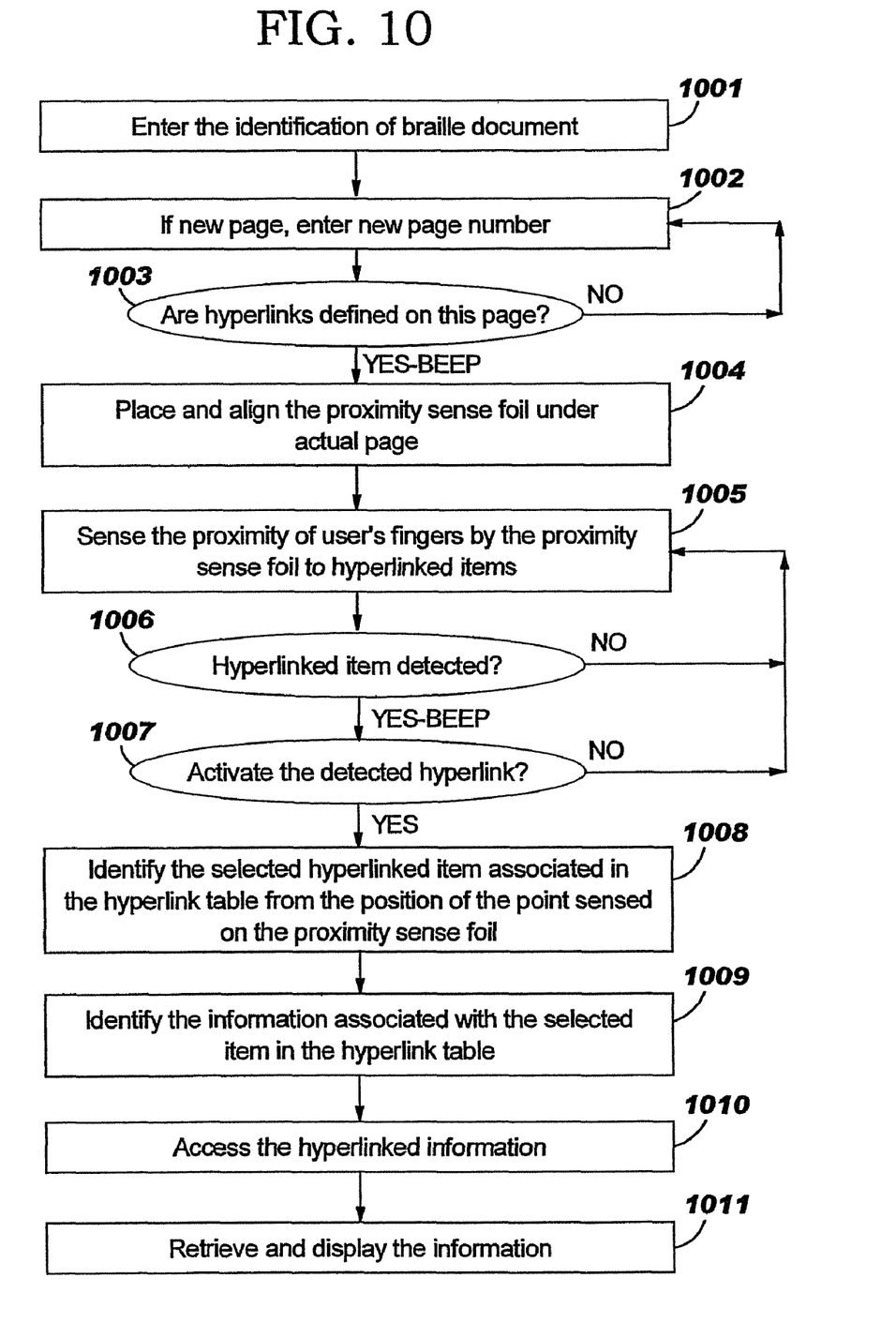
FIG. 10 shows a method for detecting and activating hyperlinks from a Braille document according to the present invention.

FIG. 2 shows a Braille document entitled "Early British Kingdoms," (Doc: 873) for blind or visually impaired users. Hyperlinks have been previously defined between certain items selected on the pages and information and/or services on the user workstation or on servers connected by a communication network, preferably the Internet. As shown in FIG. 10, the method for activating hyperlinks and for accessing information and/or services directly from the hyperlinked items located on the pages of the Braille document, comprises the steps of:

(1001) selecting a Braille document by entering the reference number of this document in the user workstation;

(1002) selecting a page (or a portion) of the Braille document by entering the page number in the user workstation;

(1003) determining whether or not the selected page comprises at least one hyperlinked items;

(1004) placing and aligning a proximity sensing foil under the selected page;

(1005) determining by means of the proximity sensing foil the position of the user's fingertips on the surface of this page;

(1006) detecting when the user's fingertips are positioned over, or nearby, a hyperlinked item and alerting the user;

(1007) selecting a detected hyperlinked item and activating the hyperlink corresponding to the hyperlinked item;

(1008) identifying the hyperlink in the hyperlink table from the position of the selected hyperlinked item, the hyperlink table comprising an indication of the position (coordinates X, Y) of each hyperlinked item on each page of the Braille document;

(1009) identifying the information or/and the service associated with the selected hyperlinked item referring to the hyperlink table, the hyperlink table comprising, for each hyperlinked item of the selected page, the identification of the requested information and/or service in the user workstation or within the network (preferably by means of a destination address);

(1010) accessing the information and/or service; and (1011) retrieving and displaying this information and/or service.

(1001) Entering the Reference Number of the Braille Document: By means of any user interface (keyboard, bar code reader, voice recognition software and microphone, and so forth), the user enters the reference number (identifier) of the document (e.g.: document 873) he wants to select (201). In the particular embodiment shown in FIG. 1, the user enters the reference number of the document (e.g.: Doc: 873) by means of a bar code reader (103). The reference number is encoded in bar codes printed on pages of the document (102), (301) on predefined reserved places. This procedure gives access to the hyperlink table (see FIG. 4) associated with the selected Braille document.

(1002) Selecting a Page of the Braille Document: In the embodiment of the invention shown in FIG. 1, the user selects a page of the Braille document (101) and enters the page number by means of the bar code reader (103). This procedure gives access to the selected page (e.g., Pg. 16) within the hyperlink table (see FIG. 4) associated with the selected document (e.g., Doc: 387).

(1003) Determining whether or not the selected page comprises hyperlinked items: If one or more hyperlinked items have been defined on the selected page, the user is alerted by a perceptible signal (e.g., a "beep"). Otherwise the user can read this page in the normal way (i.e., without placing the proximity sensing foil under the page).

(1004) Placing and aligning the proximity sensing foil under a page of the document:

As shown in FIG. 5, after the step of selecting a Braille document and a page containing hyperlinks, the proximity sensing foil is placed under the page and aligned with the borders of the selected page (e.g., by adjusting the upper left corner of the proximity sensing foil with the upper right or left corner of the page).

Figure 11:
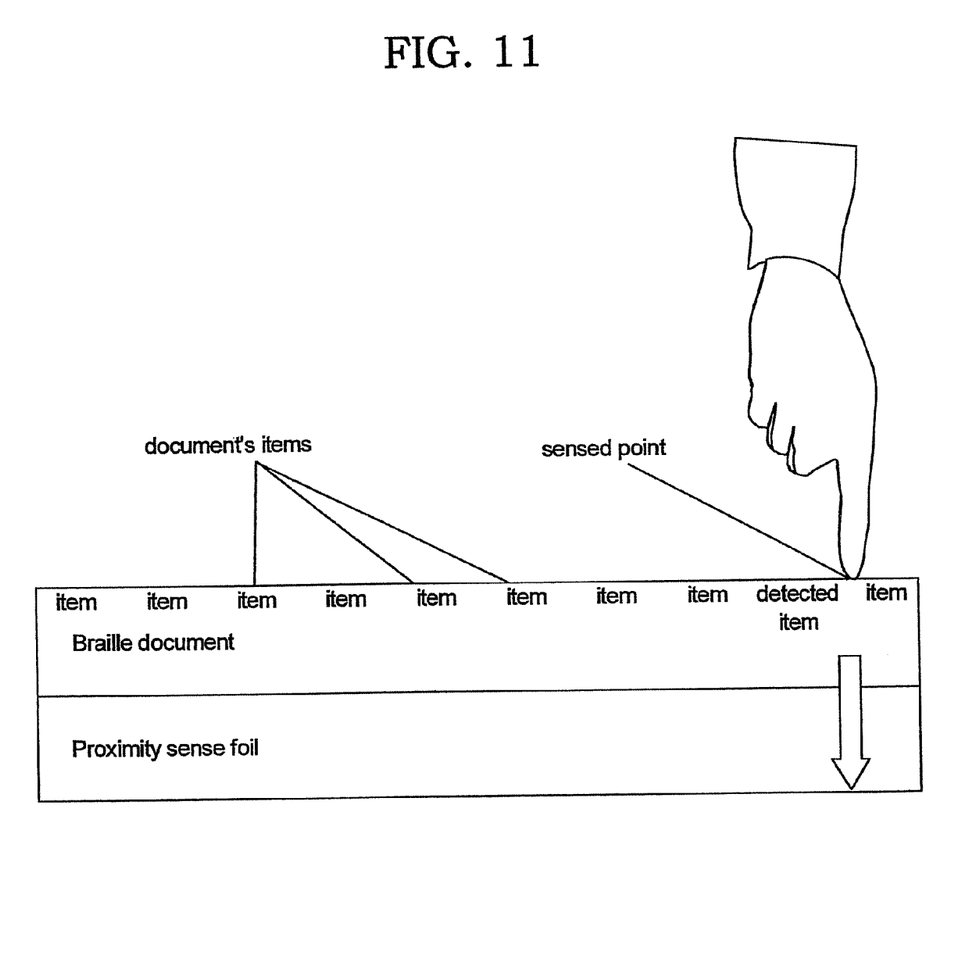
FIG. 11 shows how the proximity sensing foil detects the position of the user's fingertips over a Braille document according to the present invention.

(1005) Determining the position of the user's fingertips on the surface of the page: The operating mode of the proximity sensing foil is illustrated in FIG. 11. When the user reads the Braille document using his fingertips, the proximity sensing foil continuously detects the position of the fingertips on the surface of the page. The coordinates of the user's fingertips are directly sent to the user workstation. The user workstation, using the coordinates of the hyperlinks defined for this page on the Hyperlink Table, determines whether or not the user's fingertips are placed over a hyperlinked item on the Braille document.

(1006) Detecting when the user's fingertips are positioned over a hyperlinked item and alerting the user: As shown in FIG. 6, when the user workstation detects that the user's fingertips are placed over, or nearby, a hyperlinked item on the page (e.g., the word "Afallach"), the user is alerted by means by a perceptible signal (e.g., a "beep").

Figure 7:
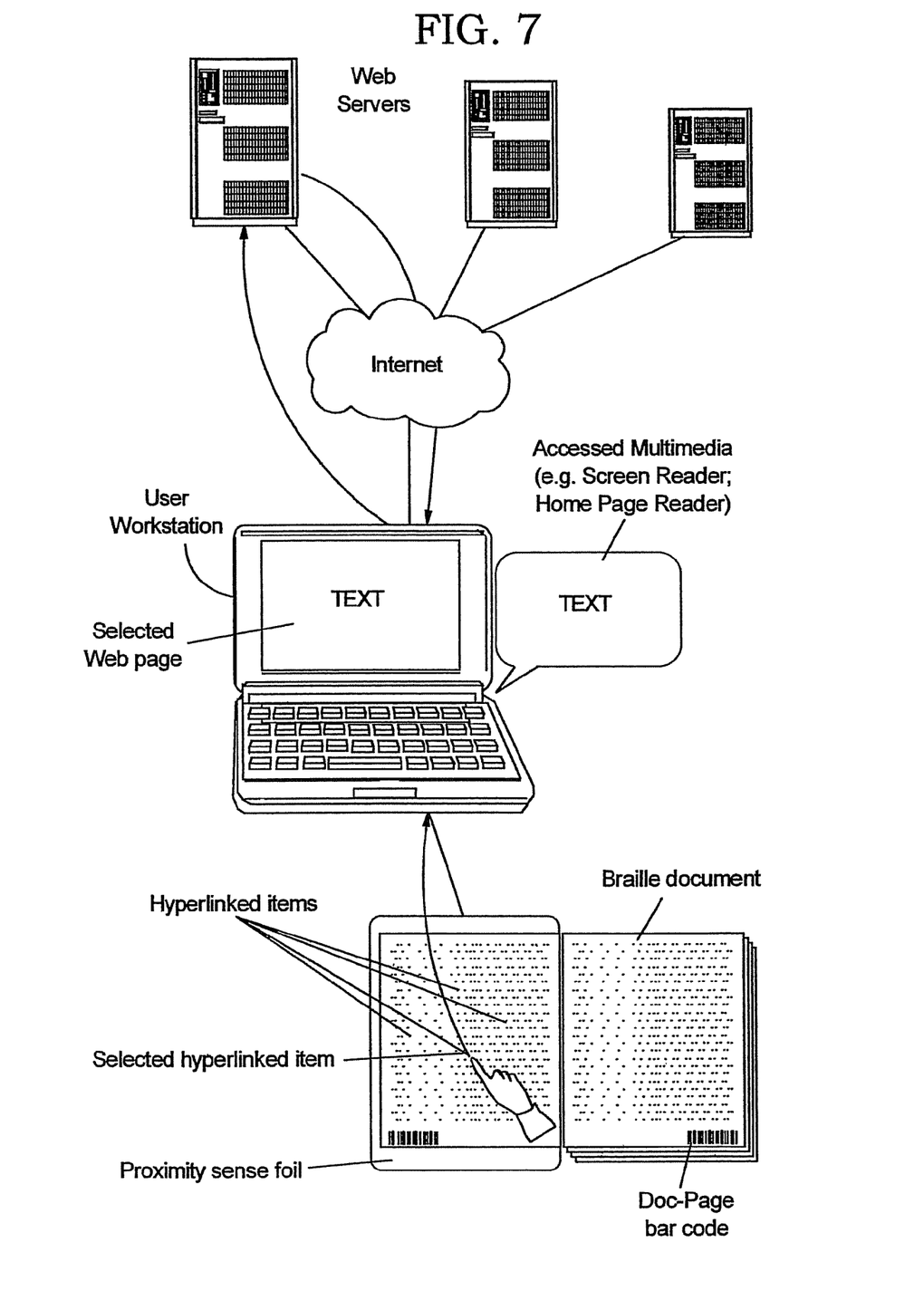
FIG. 7 shows how the user activates a hyperlink by pressing a reserved key on his workstation.

(1007) Selecting a detected hyperlink: As shown in FIG. 7, when the user detects the presence of a hyperlinked item (e.g., the word "Afallach"), he can activate this hyperlink by pressing, for example, a key on the user workstation.

Figure 8:
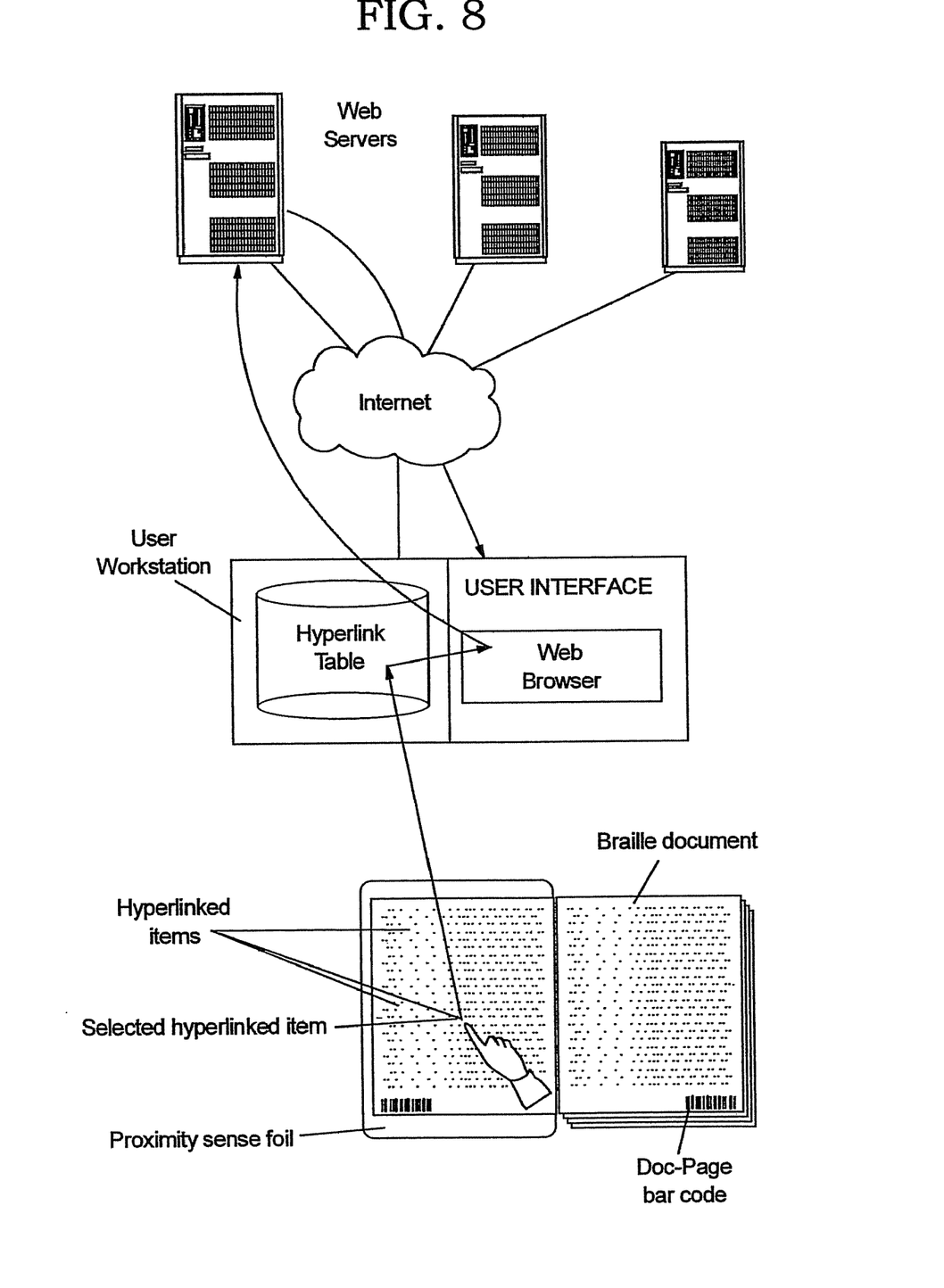
FIG. 8 shows a system for selecting and accessing Web pages from a Braille document, according to the present invention.

(1008) Identifying the hyperlink in the hyperlink table from the position of the detected hyperlinked item: As shown in FIG. 8, when the user selects a hyperlinked item ("Afallach") on the page, the proximity sensing foil generates a signal and sends it to the user workstation. The signal indicates the position of the selected item on the page. The signal is generally proportional to the coordinates (X/Y) of the point pressed. In our example, the proximity sensing foil measures the position on the page of the item ("Afallach") selected by the user. The coordinates measured at this point are approximately X=225 and Y=160.

The item selected by the user is identified by referring to the hyperlink table, which hyperlink table comprises an indication of the position (coordinates X, Y) of each hyperlinked items on each page of the document. In our example, the coordinates measured by the proximity sensing foil are approximately X=225 and Y=160, which correspond to the hyperlinked item "Afallach" in the hyperlink table.

The hyperlink table is either stored locally in the user workstation, or is retrieved from a remote server and then stored locally in the use workstation, or is stored in a remote server and accessed remotely.

(1009) Identifying the information associated with the selected item: As shown in FIG. 4, the hyperlink table includes, for each hyperlinked item of each page of the Braille document, the location within the network of the requested information and/or service. The information and/or service may be located by means of a destination address. In the Internet network, Web pages in Web Servers are identified by means of a URL (Uniform Resource Locator). In our example, the hyperlink table associates the hyperlinked Braille item "Afallach" with the URL http://freespace.virgin-.net/david.ford2/gods.html#Afallach.

(1010) Accessing the information and/or service: The user workstation Web activates the hyperlink (destination address, URL, and so forth) associated with the selected hyperlinked item in the hyperlink table. In our example, the hyperlink labeled "Afallach" is activated because the computed distance between the sensed position and the hyperlink on the hyperlink table, page 16 with coordinates X=225, Y=160 and labeled "Afallach" page 16, is smaller than a predetermined minimum value. It is concluded that user's fingertips are positioned over the hyperlink labeled "Afallach". Thus, the following Web site is accessed: http://freespace.virgin.net/david.ford2/gods.html#Afallach.

(1011) Retrieving and displaying the requested information and/or service: As shown in FIG. 7, the information or service associated with the selected destination address (URL) is retrieved and displayed on the user workstation (e.g., an audio record about "Afallach: The god of the underworld").

While the invention has been particularly shown and described with reference to a preferred embodiment, it will be understood that various changes in form and detail may be made therein without departing from the spirit, and scope of the invention.

What is claimed is:

1. A user system comprising a computer-readable memory, said memory storing computer program instructions that when executed perform a method for creating hyperlinks, said method comprising:

providing a hyperlink table that does not include a physical position on any page of a Braille document, does not comprise any spatial coordinates on a proximity sensing foil, and does not comprise any hyperlink, wherein the hyperlink table is stored in a remote server that is remote from the user system, wherein the user system and the remote server are connected to a communication network such that the communication network is disposed between the user system and the remote server, and wherein the remote system is accessed remotely by a user who is interactively using the Braille document in the user system;

detecting an item of text touched by the user, said item of text being located on a page of the Braille document, said detecting being accomplished through use of the proximity sensing foil aligned under the page while the item is being touched by the user;

determining spatial coordinates on the proximity sensing foil of the detected item through use of the proximity sensing foil;

determining an identification of the touched item based on the determined spatial coordinates;

specifying, based on said identification, a hyperlink to a destination address from which information pertaining to the touched item may be accessed, wherein the destination address is an address of the remote server;

after and responsive to both said determining an identification and said specifying a hyperlink, storing in the hyperlink table: the identification of the touched item, the hyperlink, and the determined spatial coordinates.

2. The user system of claim 1, wherein the method further comprises:

after said providing the hyperlink table and before said detecting item of text, storing in a header of the hyperlink table: a document identifier that identifies the Braille document, a title of the Braille document, at least one author of the Braille document, an International Standard Book Number (ISBN) pertaining to the Braille document, and a date associated with the Braille document.

3. The user system of claim 2, wherein the document identifier is a bar code, and wherein said storing the document identifier in the header of the hyperlink table comprises storing the bar code in the header of the hyperlink table.

4. The user system of claim 2, wherein the method further comprises: prior to said providing the hyperlink table, engraving the bar code in the Braille document.

5. The user system of claim 1, wherein the hyperlink table has a plurality of columns and a plurality of rows, wherein the plurality of columns comprises an item identification column, a hyperlink column, and a physical position column, and wherein said storing in the hyperlink table comprises storing in a row of the plurality of rows of the hyperlink table:

in the item identification column, the identification of the touched item;

in the hyperlink column, the hyperlink; and in the physical position column, the determined spatial coordinates.

6. The user system of claim 1, wherein the communication network is an Internet Protocol (IP) network, wherein the server is a web server, wherein the address of the remote server is a Uniform Resource Locator (URL), and wherein the information is a web page of a website at the URL.

7. A user system comprising a computer-readable memory, said memory storing computer program instructions that when executed perform a method for accessing information pertaining to content located in a Braille document, said method comprising:

provide a hyperlink table that comprises a plurality of columns and a plurality of rows, wherein the plurality of columns comprises an item identification column, a hyperlink column, and a physical position column, wherein each item of a plurality of items of text corresponds to a different row of the plurality of rows, wherein each different row pertaining to an item of text comprises: an identification of the item on a page of the Braille document in the identification column, a hyperlink in the hyperlink column such that the hyperlink is associated with the item on the page and such that the hyperlink is a link to an associated destination address of a remote server from which information pertaining to each item may be accessed, and an indicated position in the position column of the item on the page, wherein the hyperlink table is stored in the remote server, wherein the remote server is remote from a user system, wherein the user system and the remote server are connected to a communication network such that the communication network is disposed between the user system and the remote server, and wherein the remote system is accessed remotely by a user who is interactively using the Braille document in the user system;

receiving a document identifier that identifies the Braille document and a page identifier from the user who is interactively using the Braille document in the user system, wherein the page identifier identifies a selected page in the Braille document;

detecting a position of a fingertip of the user on the selected page of the Braille document, said detecting using a proximity sensing foil aligned under the page;

ascertaining that the fingertip on the selected page at the detected position is less than a predetermined minimum distance from the indicated position of an existing item of text of the plurality of items of text in the hyperlink table;

alerting the user in response to said ascertaining, wherein said alerting comprises generating a signal that is indicative of the detected position such that the generated signal is proportional to X/Y coordinates of the detected position;

after said alerting and responsive to said ascertaining, detecting a selection by the user of the existing item of text;

responsive to said detecting the selection by the user, identifying an existing hyperlink in the hyperlink table such that the existing hyperlink is associated with the existing item of text;

retrieving, from the destination address associated with the hyperlink in the hyperlink table with the existing hyperlink, the information pertaining to the existing item of text; and displaying the retrieved information in the user system.

8. The user system of claim 7, wherein the hyperlink table comprises a header, wherein the header comprises a document identifier that identifies the Braille document, a title of the Braille document, at least one author of the Braille document, an International Standard Book Number (ISBN) pertaining to the Braille document, and a date associated with the Braille document.

9. The user system of claim 8, wherein the document identifier is a bar code.

10. The user system of claim 7, wherein the communication network is an Internet Protocol (IP) network, wherein the server is a web server, wherein the address of the remote server is a Uniform Resource Locator (URL), and wherein the information is a web page of a website at the URL.

* * * * *